Jan. 18, 1966  R. W. SCHLIE  3,229,582

MECHANICAL PULSE TRANSFORMER

Filed Jan. 31, 1964

Roland W. Schlie
INVENTOR.

BY

ATTORNEY.

AGENT.

United States Patent Office 3,229,582
Patented Jan. 18, 1966

3,229,582
MECHANICAL PULSE TRANSFORMER
Roland W. Schlie, Silver Spring, Md., assignor to the United States of America as represented by the Secretary of the Navy
Filed Jan. 31, 1964, Ser. No. 341,810
11 Claims. (Cl. 89—1.5)
(Granted under Title 35, U.S. Code (1952), sec. 266)

The invention described herein may be manufactured and used by or for the Government of the United States of America for governmental purposes without the payment of any royalties thereon or therefor.

The present invention relates to an electro-mechanical energy converter, and more particularly to a pulse transformer which produces a high energy output pulse under certain conditions, and a low energy output pulse under all other conditions.

At the present time, fuze systems in a bomb quite frequently utilize electro-explosive devices. These electro-explosive devices have many advantages and one serious defect. Present day technology utilizes high frequency electro-magnetic radiation extensively for communication purposes, radar detection purposes and enemy jamming purposes. The electro-explosive devices are susceptible to unwanted initiation by these high frequency electromagnetic radiations. An obvious method of protecting these electro-explosive devices located within the bomb is to provide the bomb with a complete radio frequency (R.F.) shield. This complete shielding is not acceptable since this eliminates external control over these electro-explosive devices.

A fuzing system for use within a bomb attached to an aircraft should satisfy the following conditions. The fuzing system should not be vulnerable to undesired external forces, such as stray R.F. energy. The fuzing system should be capable of being controlled by the pilot of the aircraft. The fuzing system should not be activated by an accidental release of the bomb from the aircraft. Finally, the bomb fuzing system should be activated upon the simultaneous release of the bomb from the aircraft and under the control of the pilot and should not be activated by failure to release the bomb.

In order to simultaneously satisfy all these conditions the fuzing system employing an electro-explosive device should be free from stray radio frequency energy, and should be activated only upon satisfying the simultaneous conditions of a release from the aircraft and a command from the pilot. An accidental release from the aircraft without a command from the pilot, or a command from the pilot without a release from the aircraft should not initiate the electro-explosive device of the fuze system.

The present invention simultaneously satisfied all of the above listed criteria by employing a core having low residual flux and mechanically separable into at least two parts. A primary winding is wound upon one part and a secondary winding is wound upon the other part. The secondary winding is completely enclosed in an R.F. shield. Upon the simultaneous energization of the primary winding and the mechanical separation of the two parts of the core an output pulse of high energy is produced by the secondary winding. The independent excitation or de-excitation of the primary winding, or the mechanical separation of the two parts of the core without the primary winding being excited produces an output pulse of low energy from the secondary winding.

An object of the present invention is to provide an R.F. shield while simultaneously providing for electrical communication through the R.F. shield.

A further object is to provide a pulse transformer having two energy outputs dependent upon selective energization, independently or simultaneously, of two independent inputs.

Still another object is to provide a maximum difference in the output energy levels of the pulse transformer.

A further object is to minimize the residual flux and effectively eliminate the frequency responsiveness of the magnetic core of the transformer.

Another object is to provide an R.F. shield between the primary and secondary windings of the pulse transformer.

Other objects, advantages and novel features of the invention will become apparent from the following detailed description of the invention when considered in conjunction with the accompanying drawing wherein.

Figure 1:
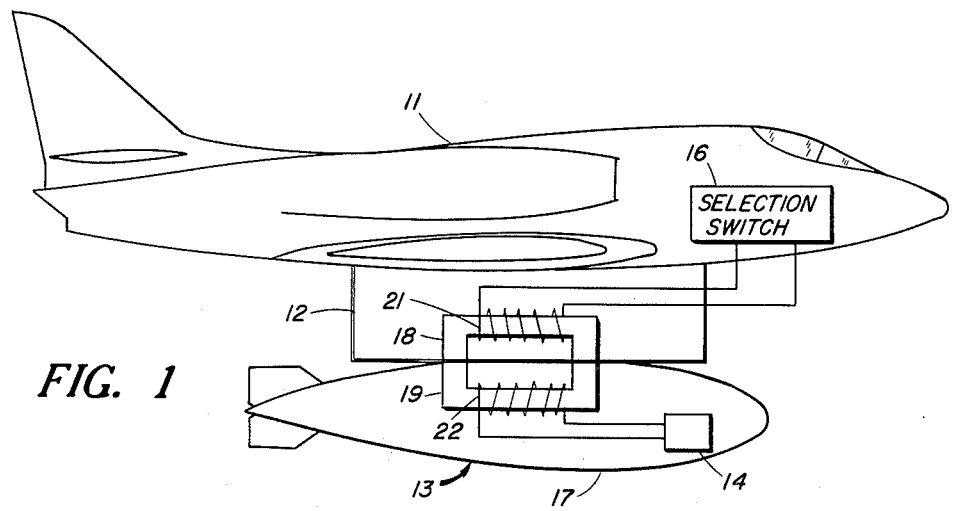
FIG. 1 is a side view of an embodiment of the invention.

FIG. 1 illustrates a conventional aircraft 11 having any suitable bomb rack 12 attached thereto. Releasably attached to the bomb rack in a conventional manner is a bomb 13. Contained within the bomb 13 is a fuze system which includes an electro-explosive device 14. The electro-explosive device is commonly referred to as an electric match, and is typically an explosive compound which detonates upon the application of a high energy electrical pulse to thereby initiate a fuze. Contained within the aircraft 11 is a selection switch 16 by means of which the pilot indicates his intention to release the bomb in an armed condition.

The skin or shell 17 of the bomb 13 is made of any suitable conductive material and completely encloses the bomb to provide an effective R.F. shield for all the components contained within the bomb. Positioned on opposite sides of the skin and in magnetic alignment are two separable parts 18 and 19 of a transformer core made of magnetic material. A primary winding 21 is magnetically coupled to one part 18 of the core which is electrically connected to the selection switch 16. The other part 19 of the core has a secondary winding 22 magnetically coupled thereto and is electrically connected to the electro-explosive device 14.

Figure 2:
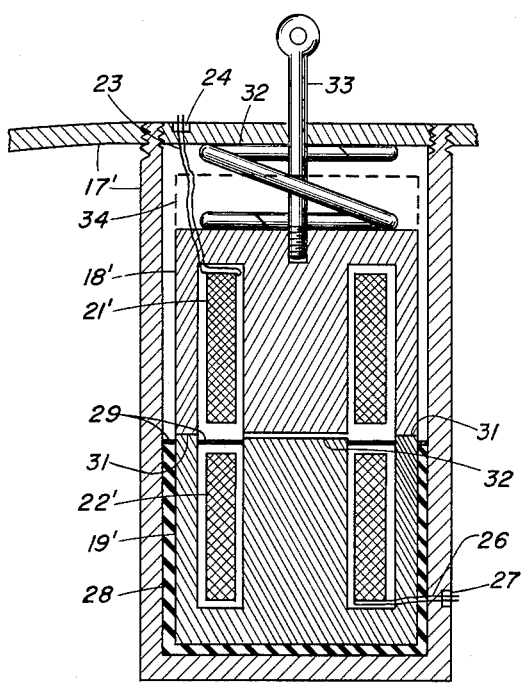
FIG. 2 is a sectional view of another embodiment of the invention.

FIG. 2 illustrates a preferred embodiment of the apparatus of FIG. 1 in which parts having the same function are designated with the same numeral as those in FIG. 1. Enclosed within a conductive shield or skin 17' is one part of the core 18' having a primary winding 21' magnetically coupled thereto. Also contained within the skin 17' is the other part of the core 19' having secondary winding 22' magnetically coupled thereto. The primary winding 21' has a pair of shielded electrical conductors 23 electrically connecting the primary winding to a connector 24. Connecter 24 is detachable, and electrically connects the primary winding 21' with a selection switch 16 within the aircraft. In a similar manner secondary winding 22' has a pair of conductors 26 leading to a similar connector 27 for electrically connecting the secondary winding to a suitable electro-explosive device 14, FIG. 1. The other part of the core 19' is rigidly positioned within the skin 17' by suitable potting or insulating material 28. The primary winding 21' and secondary winding 22' are rigidly positioned within their respective parts of the core 18' and 19' respectively. A pair of conductive washers 29 are press fitted between the skin 17' and the other part of the core 19' to complete the R.F. shielding and completely encase the secondary winding 22'. The two parts of the core 18' and 19' are separably connected at the point of contact 31 and an air gap 32 is positioned in the magnetic path between the two parts of the core 18′ and 19′. A coil spring 32 normally biases the primary core 18′ into contact with the secondary core 19′ since the primary core 18′ is slidably positioned within the skin 17′. An eye-bolt is mechanically fastened to the primary core 18′ to provide a mechanical connection between the aircraft and the bomb by means of a frangible lanyard. Upon release of the bomb from the aircraft, the primary core 18′ is moved from position as shown to that as shown by the dotted lines 34.

In operation whenever the pilot of the aircraft energizes the primary winding 21 from a D.C. power supply through operation of the selection switch 16 a low energy output pulse is produced upon secondary winding 22. Since the primary winding 21 is energized by a direct current source the output pulse upon secondary winding is a pulse of low energy and long duration. No output pulse is produced while the primary winding is energized by a constant current D.C. source since there is no change of flux. If the pilot releases the bomb 13 while the primary winding is energized by the direct current power supply, a sudden and great change in the flux would be produced resulting in a high energy output pulse on the secondary winding 22.

If the primary winding 21 is not energized by a D.C. power supply, and if the bomb be released either intentionally or unintentionally then the output pulse produced on the secondary winding 22 would be of a low energy output. The reason for this is that the core of the transformer is made of a low residual flux material, such as soft iron.

The operation in FIGS. 1 and 2 is similar, with the exception that the primary half of the core 18 and winding stays with the bomb rack 12 in FIG. 1, while in FIG. 1, while in FIG. 2 the primary 18′ and secondary 19′ windings and core are made a part of the bomb. In FIG. 2 a lanyard would connect the eye-bolt 33 to the bomb rack, and after the bomb has released a short distance the sudden tightening of the lanyard would cause a separation of the core containing the primary and secondary windings and thus produce a high energy output pulse as described hereinbefore.

From the operation it is seen that in order to have a successful arming of the bomb the pilot must intend to arm the bomb by the activation of the selection switch; must actually release the bomb through appropriate mechanisms; and the bomb must physically release. A failure in any one of the three separate acts fails to arm the bomb. This safety feature prevents the arming of a bomb both in case of a mechanical malfunction or inadvertence on the pilot's part.

In FIG. 1 it is obvious that the skin 17 provides a complete shield for R.F. energy. In FIG. 2 there is the complete shield also, but since there are electrical connections passing through the R.F. shield there is a possibility of R.F. energy entering the transformer through these conductors 23. In order to eliminate this R.F. energy, if it be present, the conductive washers 29 provide a shield from the R.F. energy between the primary coils 21′ and the secondary coils 22′. In addition to this, the cores 18′ and 19′ are preferably made of a unitary low residual magnetism material, such as soft iron. This reduces to a minimum the efficiency of a transformer to couple an A.C. power from its primary to its secondary. By making the cores of soft iron and in a unitary structure as contrasted with a laminated structure, the eddy currents produced are increased and the cores themselves act as induction heaters and effectively dissipate any R.F. energy introduced into this system.

The placing of an air gap 32 in the magnetic path of the flux produced by the primary winding 21′ decreases to a minimum any residual flux that may be present in the soft iron.

Figure 3:
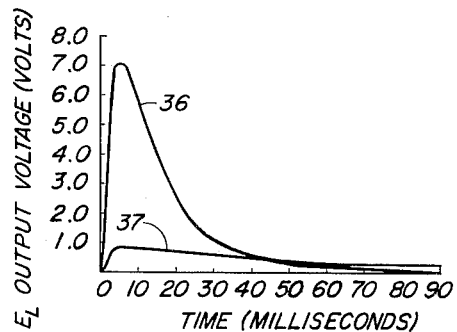
FIG. 3 is a graph illustrating the relative output voltage showing the ratio of the output voltages under different conditions of operation.

FIG. 3 is a plot of the output voltage versus time for a force separation of an experimental model of a pulse transformer employing the principles of the present invention. The primary winding was excited by a D.C. voltage and a current of 32 milliamperes. The initial velocity at separation was 4.63 feet per second. Curve 36 shows the output voltage from the secondary winding when the primary winding is energized. Curve 37 shows the output voltage of the secondary winding upon de-excitation of the primary winding.

Energy pulses will occur on the secondary winding of the the transformer whenever the primary winding is excited or de-excited or whenever the primary core is separated from the secondary core while residual flux remains in the core. FIG. 3 shows the case of de-excitation of the primary winding, since the de-excitation energy stored in the magnetic circuit must be dissipated in the secondary coil resistance and load resistance. In the case of excitation the energy is dissipated in the primary coil, the secondary coil and the load. Since the energy of excitation and de-excitation are approximately equal, it is obvious that a higher output voltage would result in the case of de-excitation.

In the case of mechanical separation of the primary core from the secondary core without the primary winding being energized by the D.C. current, the residual flux should be very low. Under these circumstances, the output voltage would be negligible.

Referring again to FIG. 3 and remembering that the power output is proportional to the square of the voltage, it immediately becomes apparent that the power output of the transformer separated while the primary winding is energized is far greater than that whenever the primary winding is energized or de-energized, or the core is separated without energization of the primary winding. The ratio of the power output of curves 36 and 37 is a ratio of approximately 21 to 1.

In view of the fact that mathematical equations setting forth the voltage and energy relations within a transformer are not well known in the case of mechanically separating a primary core from a secondary core, the following equations will more clearly set forth the relationships involved. Assume the velocity of separation of the mechanical pulse transformer is a constant $v$, and that the reluctance of the air gap $R_{(x)} = k\sqrt{x}$ where $x$ is the length of the air gap caused by the separation and $k$ is a constant. Since $x = vt$, where $t =$ time, $R_{(t)} = k\sqrt{vt}$.

The flux $\phi$ set up at any time $t$ corresponding to the reluctance $R_{(t)}$, is given by Ohms law of magnetic circuits, $$\phi = \frac{N_s I_s}{R_{(t)}} = \frac{N_s I_s}{k\sqrt{vt}} \tag{1}$$

But $$I_s = \frac{E_s}{R} \tag{2}$$

$$E_s = -N_s d\phi/dt \tag{3}$$

Where $E_s$ is the voltage induced in the secondary by the decreasing flux, and $N_s$ is the number of turns on a secondary coil and $I_s$ is the current in the secondary coil, and $R$ is a total resistance of a secondary circuit and is the sum of the secondary winding resistance $R_w$ plus that of the connected load $R_L$. Substituting Equations 2 and 3 and 1 we obtain $$\phi = \frac{-N_s^2}{Rk\sqrt{vt}} d\phi/dt \tag{4}$$

The variables, $t$ and $\phi$ can be separated and integrated to yield $$\phi = \phi_m^{-\left(\frac{2Rkv^{1/2}t^{3/2}}{3N_s^2}\right)} \tag{5}$$

Where $\phi_m$ is a maximum value of the flux just prior to the separation of the mechanical pulse transformer.

From Equation 3 we have $$E_s = \left(\frac{\phi_m R k v^{1/2} t^{1/2}}{N_s}\right) \epsilon^{-\left(\frac{2Rkv^{1/2}t^{3/2}}{3N_s^2}\right)} \quad (6)$$

and since $$E_L = E_s \frac{R_L}{R}$$

$$E_L = \frac{\phi_m R_L k v^{1/2} t^{1/2}}{N_s} \epsilon^{-\left(\frac{2Rkv^{1/2}t^{2/3}}{3N_s^2}\right)} \quad (7)$$

where $E_L$ is a voltage applied to the load $R_L$ connected to the secondary coil.

The power developed in $R_L$ is $$P_L = \frac{E_L^2}{R_L}$$

or $$P_L = \frac{\phi_m^2 R_L k^2 v t}{N_s^2} \epsilon^{-\frac{(2Rkv^{1/2}t^{3/2})}{3N_s^2}} \quad (8)$$

and the energy $$W_L = \int_0^\infty P_L dt = \int_0^\infty \frac{\phi_m^2 R_L k^2 v t}{N_s^2} \epsilon^{-\left(\frac{4Rkv^{1/2}t^{3/2}}{3N_{s2}}\right)} dt \quad (9)$$

Integrating and evaluating Equation 9 we have $$W_L = .4035 \frac{\phi_m^2 R_L k^{2/3} v^{1/3} N_s^{2/3}}{R^{4/3}} \quad (10)$$

From this it is obvious that the energy available to the load $W_L$ is proportional to the $\phi_m^2$ if the velocity is maintained constant. Thus when the core is separated with very small residual flux the $\phi_m$ is very small and the output energy is correspondingly small. When the primary coil is energized by a D.C. source, $\phi_m$ becomes quite large and the energy increases as the square of the flux $\phi_m$.

In summary therefore, it can be seen that the accidental release of a bomb at any time will fail to initiate detonation of the bomb since a low energy output electrical pulse is produced. In a similar manner the energization and de-energization of the primary winding of the core produces a low energy output pulse which does not initiate detonation. These low energy output pulses may be used to control a suitable programmer or stepping switches within the bomb to vary the fuze settings. Also diodes may be connected across the secondary winding of the transformer to make the transformer polarity sensitive. Insertion of proper shunts across the primary and secondary will enable a maximum energy to be transferred.

When the bomb is desired to be activated the pilot must do two things: he must energize the primary winding with a D.C. current; and he must release the bomb. Upon the simultaneous release of the bomb with the primary winding energized, the electro-explosive device is initiated and the fuzing of the bomb is started. Malfunction in either one of the two independent inputs fails to initiate the electro-explosive device and the bomb remains safe.

It should be understood, of course, that the foregoing disclosure relates to only preferred embodiments of the invention and that numerous modifications or alterations may be made therein without departing from the spirit and scope of the invention as set forth in the appended claims.

What is claimed is:

1. An electro mechanical pulse transformer comprising
    a magnetizable core having little residual magnetism and having at least two portions mechanically separable from each other,
    a primary winding inductively coupled to one portion of said core,
    a secondary winding inductively coupled to the other portion of said core,
    electrical means for energizing said primary winding with a direct current power source,
    and thereby instantaneously and rapidly means connected to said core for mechanically separating the two portions of said core and converting mechanical energy to electrical energy,
    whereby a low electrical energy pulse is produced on the secondary winding by the separate energization or deenergization of the primary winding or the mechanical separation of the two portions of the core, and a high electrical energy pulse is produced on the secondary winding by the simultaneous rapid mechanical separation of the two portions of the core while the primary winding is energized.

2. Apparatus as recited in claim 1 wherein said magnetizable core comprises a unitary structure of soft iron.

3. Apparatus as recited in claim 1 further comprises an electro-explosive device connected to said secondary winding.

4. An apparatus as recited in claim 3 further comprises an aircraft having said primary winding fixedly attached to the aircraft and a bomb having said secondary winding integral therewith.

5. An apparatus as recited in claim 3 further comprises a bomb enclosing therein both portions of said core and an aircraft having an electrical connection to said primary winding from said electrical energizing means.

6. A radio-frequency free electro-mechanical pulse transformer comprising
    a magnetizable core of low residual magnetism having a first portion mechanically separable from a second portion,
    means connected to the core for mechanically separating the two portions thereof,
    a primary winding magnetically coupled to said first portion, said primary winding being adapted to be energized by a direct current power source,
    a secondary winding magnetically coupled to said second portion, said secondary winding being adapted to be connected to a load,
    and a conductive shield means completely enclosing said second portion of said core and said secondary winding to completely shield the enclosed parts from all radio-frequency energy,
    whereby a low electrical energy pulse is produced on said secondary winding by a separate energization or de-energization of said primary winding or the mechanical separation of the two portions of the core and a high electrical energy pulse is produced on said secondary winding by simultaneous rapid mechanical separation of the two portions of the core while said primary winding is energized.

7. Apparatus recited in claim 6 wherein said magnetizable core comprises a unitary structure of soft iron.

8. Apparatus as recited in claim 6 further comprises an electro-explosive device connected to said secondary winding as a load.

9. Apparatus as recited in claim 8 further comprises an aircraft having said primary winding fixedly attached to the aircraft and a bomb having said secondary winding integral therewith.

10. Apparatus as recited in claim 8 further comprises a bomb enclosing therein both portions of said core and an aircraft having an electrical connection to said primary winding from an electrical energizing means within said aircraft.

11. An arming system for use in the bomb comprising,
    a conductive radio-frequency shield completely enclosing a bomb having
        an electro-explosive device within said shield,
        a first portion of a transformer core contained within said shield,
        and a secondary winding magnetically coupled to said first portion of the transformer core and electrically connected to said electro-explosive device, and an aircraft having means for carrying and mechanically releasing the bomb including
- a direct current power source,
- a second portion of a transformer core in magnetic alignment with said first portion of said transformer core,
- and a primary winding magnetically coupled to said second portion and electrically connected to said power source, whereby a low electrical energy pulse is produced on said secondary winding by the separate energization or deenergization of said primary winding or the mechanical separation of the two portions of the transformer core and a high electrical energy pulse is produced on said secondary winding by the simultaneous rapid mechanical separation of the two portions of the core while said primary winding is energized.

References Cited by the Examiner

UNITED STATES PATENTS

| | | | |
|---|---|---|---|
| 2,609,531 | 9/1952 | Kirchner | 336—83 |
| 2,981,190 | 4/1961 | Will et al. | 102—70.2 |
| 3,017,544 | 1/1962 | Kane et al. | 336—212 X |
| 3,130,381 | 4/1964 | Oeler et al. | 336—84 |
| 3,148,619 | 9/1964 | Holinbeck | 102—70.2 X |

FOREIGN PATENTS 525,333  8/1940  Great Britain.

BENJAMIN A. BORCHELT, *Primary Examiner.*

SAMUEL W. ENGLE, *Assistant Examiner.*